US009051218B2

(12) United States Patent
Kiesewetter et al.

(10) Patent No.: US 9,051,218 B2
(45) Date of Patent: Jun. 9, 2015

(54) BUILDING COMPOSITION COMPRISING CELLULOSE ETHER

(71) Applicants: Rene Kiesewetter, Wietzendorf (DE); Grit Grote, Soltau (DE); Meinolf Brackhagen, Walsrode (DE); Matthias Knarr, Nienburg/Weser (DE); Roland Adden, Walsrode (DE)

(72) Inventors: Rene Kiesewetter, Wietzendorf (DE); Grit Grote, Soltau (DE); Meinolf Brackhagen, Walsrode (DE); Matthias Knarr, Nienburg/Weser (DE); Roland Adden, Walsrode (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/993,259

(22) PCT Filed: Nov. 15, 2012

(86) PCT No.: PCT/US2012/065140
§ 371 (c)(1),
(2) Date: Jun. 11, 2013

(87) PCT Pub. No.: WO2013/081836
PCT Pub. Date: Jun. 6, 2013

(65) Prior Publication Data
US 2014/0287148 A1 Sep. 25, 2014

Related U.S. Application Data

(60) Provisional application No. 61/565,653, filed on Dec. 1, 2011.

(51) Int. Cl.
*C04B 24/38* (2006.01)
*C04B 28/02* (2006.01)
(Continued)

(52) U.S. Cl.
CPC .............. *C04B 24/383* (2013.01); *C04B 16/02* (2013.01); *C04B 18/24* (2013.01); *C04B 28/02* (2013.01);
(Continued)

(58) Field of Classification Search
CPC .......... C04B 16/02; C04B 18/24; C08B 11/00
See application file for complete search history.

(56) References Cited

U.S. PATENT DOCUMENTS

| 6,228,416 | B1 | 5/2001 | Reibert et al. | |
| 7,005,515 | B2 * | 2/2006 | Schneider et al. | ............ 536/124 |

FOREIGN PATENT DOCUMENTS

| EP | 2336191 | 6/2001 |
| EP | 1983004 | 10/2008 |

(Continued)

OTHER PUBLICATIONS

"The US and Dry Mix Mortar Additives Market". Frsot and Sullivan Research Service. May 2009 [Retrieved on Sep. 20, 2014]. Retrieved from http://www.frost.com/prod/servlet/report-brochure.pag?id=N2D8-01-00-00-00.*

(Continued)

*Primary Examiner* — Kaj K Olsen
*Assistant Examiner* — Karam Hijji
(74) *Attorney, Agent, or Firm* — Andrew E. C. Merriam; Steven W. Mork

(57) ABSTRACT

Cellulose ethers, wherein at least a part of the hydroxyl groups of the cellulose backbone are substituted by methoxy groups and hydroxyalkoxy groups, and optionally alkoxy groups being different from methoxy groups, having an unconventional distribution of methoxy substituents at the 2-, 3- and 6-positions of the anhydroglucose units are described. Such cellulose ethers exhibit significantly higher thermoreversible gel strengths than any known hydroxyalkyl methyl celluloses of comparable viscosity and kind and level of substitution rendering them useful as additives for building compositions such as cement based tile adhesives. In particular, such cellulose ethers can be used to improve the attainable adhesion strength after heat storage conditioning and the temporal setting characteristics of a building composition.

7 Claims, 1 Drawing Sheet

(51) Int. Cl.
  *C04B 28/04* (2006.01)
  *C04B 40/00* (2006.01)
  *C08B 11/193* (2006.01)
  *B28B 11/04* (2006.01)
  *C04B 16/02* (2006.01)
  *C04B 18/24* (2006.01)

(52) U.S. Cl.
  CPC .............. *C04B 28/04* (2013.01); *C04B 40/0028* (2013.01); *C08B 11/193* (2013.01); *B28B 11/04* (2013.01); *B28B 11/042* (2013.01)

(56) References Cited

FOREIGN PATENT DOCUMENTS

| GB | 1487859 | 10/1977 | |
| WO | WO 8600291 A1 * | 1/1986 | |
| WO | 0059947 | 10/2000 | |
| WO | 03106366 | 12/2003 | |

OTHER PUBLICATIONS

Journal of Applied Polymer Science, 24 (1979), pp. 1073-1087.
G. Bartelmus and R. Ketterer, Z. Anal. Chem., 286 (1977) 161-190.
Carbohydrate Research, 176 (1988) 137-144, Elsevier Science Publishers B.V., Amsterdam.
R.G. Ackman, J. Gas Chromatogr., 2 (1964) 173-179.
R.F. Addison, R.G. Ackman, J. Gas Chromatogr., 6 (1968) 135-138.
D.P. Sweet, R.H. Shapiro, P. Albersheim, Carbohyd. Res., 40 (1975) 217-225.
Kinetics of Thermal Gelation of Methylcellulose and Hydroxypropylmethylcellulose in aqueous solutions, Carbohydrate Polymers, Applied Science Publishers, Ltd. Barking, GB, vol. 26, No. 3, Jan. 1, 1995, pp. 195-203.

* cited by examiner

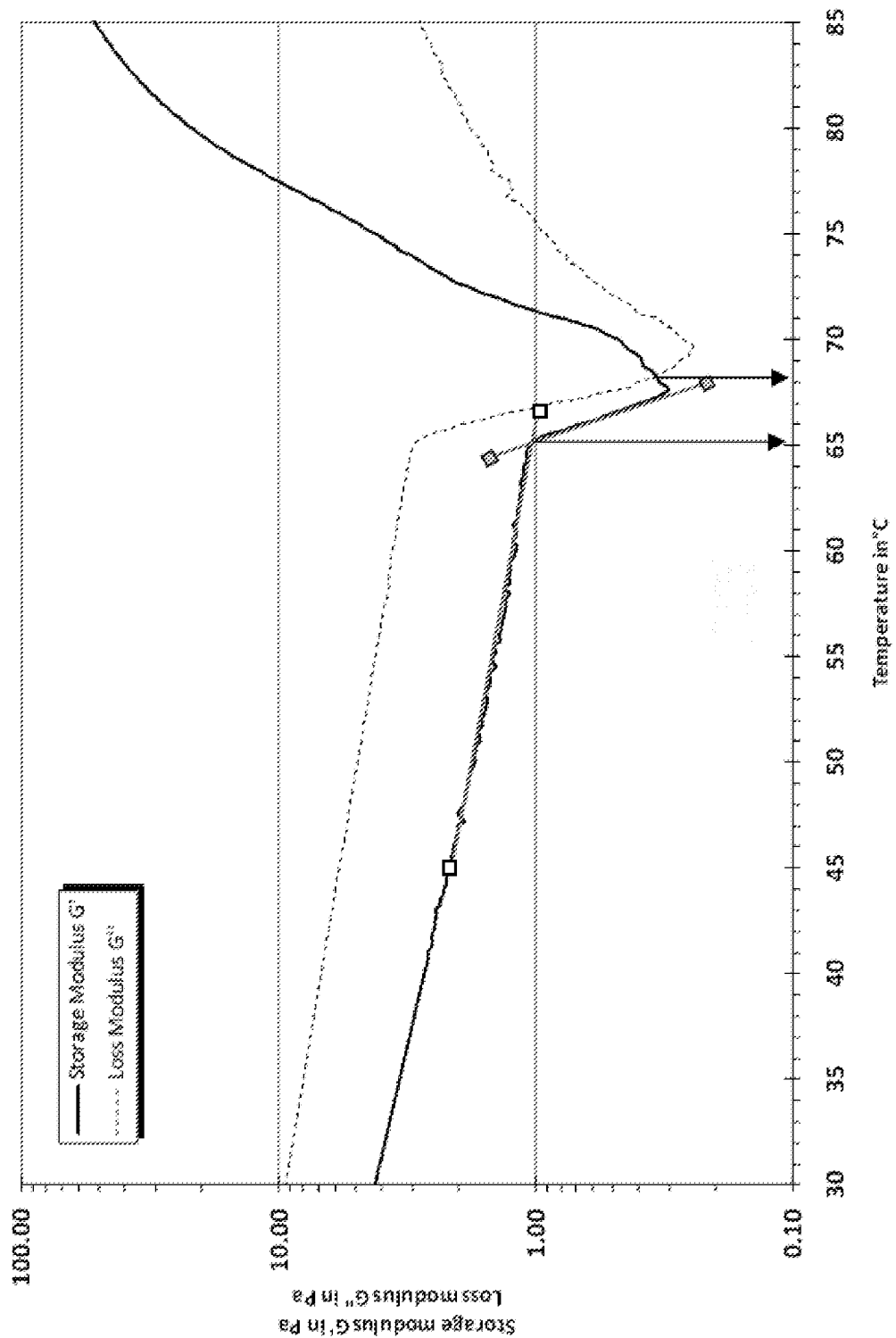

BUILDING COMPOSITION COMPRISING CELLULOSE ETHER

This invention relates to a building composition comprising one or more gel-forming cellulose ethers, a method of applying such building composition and the use of the aforesaid cellulose ethers for construction applications.

Cellulose ethers like methyl cellulose (MC), hydroxypropyl methyl cellulose (HPMC) or hydroxyethyl methyl cellulose (HEMC) find wide-spread application as additives to improve the performance of building compositions such as mortars, grouts, plasters, stucco, adhesives and wall/ceiling texturizers.

The performance of a cellulose ether as additive for building compositions is affected by the thermal characteristics of the cellulose ether. Methyl cellulose and hydroxyalkyl methyl celluloses are known to undergo thermoreversible gelation. Specifically, when an aqueous solution of such cellulose ether is heated above its gelation temperature a hydrous gel is formed. The process is reversible, i.e. when cooled below the gelation temperature, the gel turns again into an aqueous solution with time. The formation of a gel of moderate strength is considered to promote the water retention capabilities of a cellulose ether additive in a hydraulically setting building composition potentially enhancing the attainable mechanical strength of the composition. For effective gel formation in building compositions the gelation temperature should be below the temperature attained upon setting of the hydraulic composition (commonly peak temperatures in the range of 60-70° C.), but at the same time well above natural exposure temperatures, which may e.g. be as high as 50° C. in the case of intense sun exposure, to prevent premature gelation.

Conventional methyl cellulose having a degree of methoxy substitution corresponding to 30 wt. % may fulfil the desired gel formation requirements, for instance exhibiting a gelation temperature of 52-57° C. in a 1.5 wt. % aqueous solution and a gel strength, measured as dynamic elastic modulus G' in a 1.5 wt. % aqueous solution, of about 200 Pa at a viscosity of 15 mPa·s to about 1,800 Pa at a viscosity of 40,000 mPa·s (viscosity measured in 2 wt. % aqueous solution). However, conventional methyl celluloses do not dissolve properly at ambient temperature, i.e. the aqueous medium needs to be cooled to a temperature typically below 10° C. for this purpose, which is highly disadvantageous for the application in building compositions.

WO 00/59947 discloses methyl celluloses providing significantly higher gel strengths in a range of 569 Pa at a viscosity of 29 mPa·s to 5,445 Pa at a viscosity of 17,000 mPa·s (viscosity measured in 2 wt. % aqueous solution) and having lower gelation temperatures in the range of 31-54° C. These unconventional properties were attributed to a less uniform distribution of methylated sites along the cellulose chains than in conventional methyl celluloses, referred to as a "blocky" substitution, caused by a characteristic multistage etherification process. The extraordinary high gel strengths of the methyl celluloses described in WO 00/59947 are beneficial to applications in the food and pharmaceutical industry, but not to the use in hydraulically setting building compositions because such rigid gels firmly entrap water impeding the hydration of cementitious phases in the composition.

Introduction of hydroxyalkoxy substituents yields more hydrophilic cellulose ethers, which dissolve more readily at higher temperatures, e.g. at ambient temperature, than methyl celluloses without hydroxyalkoxy substituents. However, hydroxyalkyl methyl celluloses commonly attain significantly lower gel strengths compared to methyl cellulose. The gel strength decreases with increasing molar substitution of hydroxyalkoxy groups. For instance N. Sarkar discusses in Journal of Applied Polymer Science, 24 (1979), pp. 1073-1087 the thermal gelation properties of methyl cellulose and hydroxypropyl methyl cellulose (HPMC). FIG. 9 of this article illustrates that the gel strength of a HPMC with an MS (hydroxypropoxy) of 0.10 is only about one third of the gel strength of methyl cellulose.

To resolve the issue of low gel strength of hydroxyalkyl methyl celluloses, EP 1 983 004 A1 to Shin-Etsu Chemical Co. Ltd proposes a hydroxyalkyl methyl cellulose having a degree of methoxy substitution of 1.6-1.9 and a molar substitution of hydroxyalkoxy groups in the range of 0.05-0.10, wherein the molar fraction of hydroxyalkoxy groups whose hydroxyl group is further methylated to hydroxyalkoxy groups having hydroxyl groups not further substituted is 0.4 or greater. Such hydroxyalkyl methyl celluloses are water-soluble at 20-30° C. and have thermoreversible gel strengths comparable to conventional methyl cellulose.

However, it would be desirable to increase the gel strength of hydroxyalkyl methyl celluloses in another way than by limiting the molar substitution of hydroxyalkyl groups to values as low as 0.05-0.10 since a higher MS provides better dissolution characteristics at room temperature and higher temperatures. The solubility of the hydroxyalkyl methyl celluloses described in EP 1 983 004 A1 is insufficient at temperatures in the range of 30-50° C., which may readily be achieved in warm climate zones compromising the performance of the cellulose ether upon application as additive in building compositions. Moreover, control of the molar substitution of hydroxyalkoxy groups in a wider range is also attractive from the point of adjusting the wetting properties and surface activity of the cellulose ether to a level desired for the respective application.

In view of the foregoing, the present invention addresses the problem of providing cellulose ethers optimized for the use as additives in building compositions, having adequate dissolution characteristics at temperatures in the range of 10-50° C. and a higher gel strength than known comparable hydroxyalkyl methyl celluloses. The present invention is directed to the use of such cellulose ether for building applications and methods applying a building composition comprising such cellulose ether, particularly aiming at improving the application properties of hydraulically setting building compositions with respect to at least one performance parameter, especially the attainable adhesion strength and/or the setting characteristics, at the same or a lower level of cellulose ether.

Surprisingly hydroxyalkyl methyl celluloses providing a higher gel strength than known comparable hydroxyalkyl methyl celluloses as well as adequate dissolution characteristics at temperatures in the range of 10-50° C. have been found, which are useful as additives for building compositions. The hydroxyalkyl methyl celluloses according to this invention have an unconventional distribution of the methoxy group substituents at the 2-, 3- and 6-positions of the anhydroglucose units, characterized by ($S_{23}/S_{26}$–0.2*MS), as defined below, of 0.38 or less.

The inventors have found that hydraulically setting building compositions comprising such hydroxyalkyl methyl celluloses with ($S_{23}/S_{26}$–0.2*MS) of 0.38 or less exhibit higher adhesion strength after heat storage conditioning and/or improved setting characteristics compared to hydraulically setting building compositions comprising the same amount of a comparable hydroxyalkyl methyl cellulose.

In a first aspect, the present invention thus provides a building composition comprising at least one hydraulically setting material and at least one cellulose ether, wherein at least a part of the hydroxyl groups of the cellulose backbone of the at least one cellulose ether are substituted by methoxy groups and hydroxyalkoxy groups such that $(S_{23}/S_{26}-0.2*MS)$ is 0.38 or less, wherein MS is the molar substitution of hydroxyalkoxy groups and $S_{23}$ represents the molar fraction of the anhydroglucose units, wherein only the hydroxyl groups at the 2- and 3-positions of the anhydroglucose units are each substituted by a methoxy group and wherein $S_{26}$ represents the molar fraction of the anhydroglucose units, wherein only the two hydroxyl groups at the 2- and 6-positions of the anhydroglucose units are each substituted by a methoxy group.

In a second aspect, the present invention provides a method of applying a building composition to at least one structural construction element, which method comprises:
  a) providing a building composition comprising at least one hydraulically setting material and at least one cellulose ether as set forth above,
  b) contacting the structural construction element with the building composition, and
  c) allowing the building composition to set.

In a third aspect the invention is related to the use of a cellulose ether as set forth above for construction applications.

FIG. 1 illustrates how to determine the precipitation temperature and the gelation temperature from a plot of log G' and log G" vs. temperature in degrees Celsius for the case of a cellulose ether of the present invention yielding a pronounced drop of log G' vs. temperature in degrees Celsius to a local minimum.

The at least one cellulose ether present in the building composition according to the invention, the method of applying such building composition or employed in the use according to the invention, respectively, has a cellulose backbone having β-1,4 glycosidically bound D-glucopyranose repeating units, designated as anhydroglucose units in the context of this invention, which are represented for unsubstituted cellulose by the formula

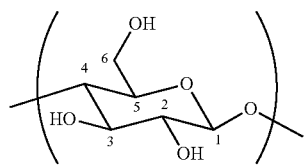

(1)

illustrating the numbering of the carbon atoms in the anhydroglucose units. The numbering of the carbon atoms in the anhydroglucose units is referred to in order to designate the position of substituents covalently bound to the respective carbon atom. In the cellulose ether of the present invention, at least a part of the hydroxyl groups of the cellulose backbone at the 2-, 3- and 6-positions of the anhydroglucose units are substituted by methoxy groups and hydroxyalkoxy groups, and optionally alkoxy groups different from methoxy groups.

The hydroxyalkoxy groups in the cellulose ether of the present invention can independently be the same or different from each other. They are typically, without being limiting, each individually selected from linear or branched hydroxyalkoxy groups with 1 to 3 carbon atoms such as hydroxymethoxy, hydroxyethoxy and/or hydroxypropoxy. Hydroxyethoxy and/or hydroxypropoxy groups are preferred. Typically one or two kinds of hydroxyalkoxy groups are present in the cellulose ether according to the present invention. Preferably a single kind of hydroxyalkoxy group is present.

Besides the substitution by methoxy groups and hydroxyalkoxy groups, a part of the hydroxyl groups of the cellulose backbone of the at least one cellulose ether according to the invention may be substituted by alkoxy groups being different from methoxy groups. The alkoxy groups being different from methoxy groups optionally present can independently be the same or different from each other. They are typically each individually selected from linear or branched alkoxy groups with 2 to 4 carbon atoms such as ethoxy and/or propoxy groups, wherein the term propoxy comprises n-propoxy and isopropoxy groups. Ethoxy groups are preferable. If present, typically not more than two kinds, preferably only a single kind of optional alkoxy substituent being different from methoxy groups is present in the cellulose ethers of the present invention.

Preferred binary (mixed cellulose ethers with two different substituents, e.g. methoxy and hydroxyethyl) cellulose ethers according to the present invention are thus hydroxyalkyl methyl celluloses, particularly hydroxy-$C_{1-3}$-alkyl methyl celluloses. In a particularly preferred embodiment the at least one cellulose ether according to the invention is a hydroxyethyl methyl cellulose and/or a hydroxypropyl methyl cellulose. Examples of ternary cellulose ethers include ethyl hydroxypropyl methyl celluloses, ethyl hydroxyethyl methyl celluloses and/or hydroxyethyl hydroxypropyl methyl celluloses.

The degree of the substitution of hydroxyl groups at the 2-, 3- and 6-positions of the anhydroglucose units by hydroxyalkoxy groups is expressed by the molar substitution of hydroxyalkoxy groups (MS). The MS is the average number of moles of hydroxyalkoxy groups per anhydroglucose unit in the cellulose ether. It is to be understood that during the hydroxyalkylation reaction the hydroxyl group of a hydroxyalkoxy group bound to the cellulose backbone can be further etherified by an alkylation agent, e.g. a methylation agent, and/or a hydroxyalkylation agent. Multiple subsequent hydroxyalkylation etherification reactions with respect to the same carbon atom position of an anhydroglucose unit yields a side chain, wherein multiple hydroxyalkoxy groups are covalently bound to each other by ether bonds, each side chain as a whole forming a hydroxyalkoxy substituent to the cellulose backbone. The term "hydroxyalkoxy groups" thus has to be interpreted in the context of the MS as referring to the hydroxyalkoxy groups as the constituting units of hydroxyalkoxy substituents, which either comprise a single hydroxyalkoxy group or a side chain as outlined above, wherein two or more hydroxyalkoxy units are covalently bound to each other by ether bonding. Within this definition it is not important whether the terminal hydroxyl group of a hydroxyalkoxy substituent is further alkylated, e.g. methylated, or not; both alkylated and non-alkylated hydroxyalkoxy substituents are included for the determination of MS. The cellulose ether according to the invention preferably has a molar substitution of hydroxyalkoxy groups in the range of 0.11 to 1.00, more preferably in the range of 0.12 to 0.80, even more preferably in the range of 0.13 to 0.60 and most preferably in the range of 0.14 to 0.50.

The average number of hydroxyl groups substituted by methoxy groups per anhydroglucose unit, is designated as the degree of substitution of methoxy groups (DS). In case all hydroxyl groups at the 2-, 3- and 6-positions of the anhydroglucose units of the cellulose backbone would be replaced by methoxy groups, DS would for instance be 3.0. In the above-given definition of DS, the term "hydroxyl groups substituted by methoxy groups" is to be construed within the present invention to include not only methylated hydroxyl groups directly bound to the carbon atoms of the cellulose backbone, but also methylated hydroxyl groups of hydroxyalkoxy substituents bound to the cellulose backbone. The cellulose ethers according to this invention preferably have a DS in the range of 1.2 to 2.2, more preferably in the range of 1.25 to 2.10 and most preferably in the range of 1.40 to 2.00. The degree of substitution of methoxy groups and the molar substitution of hydroxyalkoxy groups can be determined by Zeisel cleavage of the cellulose ether with hydrogen iodide and subsequent quantitative gas chromatographic analysis (G. Bartelmus and R. Ketterer, Z. Anal. Chem., 286 (1977) 161-190).

An essential feature of the cellulose ethers of the present invention is their unique distribution of the methoxy substituents on the anhydroglucose units, which is characterized by $[S_{23}/S_{26}-0.2*MS]$ being 0.38 or less, preferably 0.36 or less, more preferably 0.35 or less, even more preferably 0.34 or less, and most preferably 0.33 or less. Typically $[S_{23}/S_{26}-0.2*MS]$ is at the same time 0.07 or more, more typically 0.10 or more, and most typically 0.13 or more. As used herein, the symbol "*" represents the multiplication operator. $S_{23}$ represents the molar fraction of the anhydroglucose units, wherein only the two hydroxyl groups at the 2- and 3-positions of the anhydroglucose units are each substituted by a methoxy group, whereas the hydroxyl groups at the 6-positions of the anhydroglucose units are not substituted by a methoxy group. For example the hydroxyl groups at the 6-positions of the anhydroglucose units can then be unsubstituted hydroxyl groups or substituted by hydroxyalkoxy substituents, methylated hydroxyalkoxy substituents, alkylated hydroxyalkoxy substituents or alkoxy groups different from methoxy groups. $S_{26}$ represents the molar fraction of the anhydroglucose units, wherein only the two hydroxyl groups at the 2- and 6-positions of the anhydroglucose units are each substituted by a methoxy group, whereas the hydroxyl groups at the 3-positions of the anhydroglucose units are not substituted by a methoxy group. For example the hydroxyl groups at the 3-positions of the anhydroglucose units can then be unsubstituted hydroxyl groups or substituted by hydroxyalkoxy substituents, methylated hydroxyalkoxy substituents, alkylated hydroxyalkoxy substituents or alkoxy groups different from methoxy groups.

The quantitative determination of ether substituents in cellulose ethers is generally known and e.g. described in Carbohydrate Research, 176 (1988) 137-144, Elsevier Science Publishers B. V., Amsterdam, Distribution of substituents in o-ethyl-o-(2-hydroxyethyl)cellulose by Bengt Lindberg, Ulf Lindquist and Olle Stenberg. How to determine the ratio $S_{23}/S_{26}$ is moreover explicitly exemplified in detail in the Experimental section.

The viscosity of the at least one cellulose ether according to the present invention, is not particularly limited. However, it is preferred that the at least one cellulose ether has a viscosity of more than 150 mPa·s, preferably from 500 to 200,000 mPa·s, more preferably from 500 to 100,000 mPa·s, most preferably from 1,000 to 60,000 mPa·s, as measured for a 1.5 wt. % aqueous solution of the cellulose ether at 20° C. and a shear rate of 2.55 s$^{-1}$ with a Haake RS600 rheometer with a cone and plate geometry (CP-60/2°).

It has surprisingly been found that the above described cellulose ethers characterized by $[S_{23}/S_{26}-0.2*MS]$ being 0.38 or less can have unconventional temperature dependent precipitation and/or gelation properties. These properties can be analyzed by dynamic rheometry, wherein the storage modulus G' representing the dynamic elastic properties of the analyzed solution of the cellulose ether and the loss modulus G" representing the viscous properties of that solution are measured. G' and G" may e.g. be measured for a 1.5 wt. % aqueous solution of the respective cellulose ether under atmospheric pressure using an Anton Paar Physica MCR 501 rheometer (Ostfildern, Germany) with a Cup & Bob set-up (CC-27) and a peltier temperature control system in oscillation shear flow mode at a constant frequency of 2 Hz and a constant deformation amplitude of 0.5% from 10° C. to 85° C. with a heating rate of 1° C./min.

The temperature dependent precipitation and gelation properties of the analyzed cellulose ether can be derived from a plot of log G' and log G" versus normal (non-log) temperature. In the ungelled and non-precipitated state in the low temperature regime G" is greater than G', and G' as well as G" decrease typically steadily with increasing temperature. When precipitation occurs, the storage modulus exhibits a pronounced drop to a local minimum in the plot of log G' versus normal (non-log) temperature as shown exemplarily in FIG. 1. In such case, the precipitation temperature is determined as the temperature corresponding to the intersection of two tangents in the log G' versus normal (non-log) temperature plot as illustrated in FIG. 1. The first tangent is fitted to the steady decrease of G' with increasing temperature in a temperature interval from 20° C. below to 3° C. below the temperature corresponding to the inflection point of the drop of G' to the local minimum. The second tangent is fitted to the drop of G' to the local minimum in a temperature interval of 1° C. being centered at said inflection point. Within this invention a drop of G' to a local minimum is only considered for the determination of a precipitation temperature, if the local minimum is pronounced, i.e. less than half of the value of the first tangent extrapolated to the same temperature. If no such pronounced local minimum is present in the plot of log G' versus normal (non-log) temperature, a precipitation temperature is considered to be not detectable. Upon gelation G' increases significantly becoming greater than G". The gelation temperature is determined as the temperature at which G'/G"=1.

It has been found that the cellulose ethers according to the invention typically do not have a detectable precipitation temperature or have a gelation temperature that is less than 3° C., preferably less than 2.5° C., more preferably less than 2° C., above the precipitation temperature, as determined for a 1.5 wt. % aqueous solution of the respective cellulose ether under atmospheric pressure. The gelation temperature is typically in a range from 50 to 70° C.

Furthermore, it is found that the at least one cellulose ether according to the present invention can have a surprisingly high gel strength. The gel strength is measured as the storage modulus G' at a temperature for which the aqueous solution of the cellulose ether is characterized by G'/G"≥1, i.e. when it forms a gel. The at least one cellulose ether according to the invention typically has a storage modulus G' as measured for a 1.5 wt. % aqueous solution of the cellulose ether at 80° C. of at least 50 Pa, preferably of at least 75 Pa, more preferably of at least 100 Pa and typically less than 1000 Pa, more preferably less than 750 Pa, even more preferably less than 600 Pa, most preferably less than 350 Pa. All ranges between the cited minimum and maximum values are included. Preferably G' as measured for a 1.5 wt. % aqueous solution of the cellulose ether at 80° C. is in the range of 50 to 1000 Pa, more preferably in the range of 100 to 750 Pa and even more preferably in the range of 100 to 350 Pa. Such gel strengths may not only be achieved for cellulose ethers according to the invention with a comparatively low MS of 0.11 to 0.30, but also when the molar substitution of hydroxyalkoxy groups is in the range from >0.30 up to 1.00, or up to 0.80 or up to 0.60, particularly for a viscosity of more than 150 mPa·s, as measured for a 1.5 wt. % aqueous solution of the cellulose ether at 20° C. and a shear rate of 2.55 s$^{-1}$ as defined above. However, due to lower manufacturing costs, cellulose ethers with a MS in the range of 0.11 to 0.30 are preferable. The cellulose ethers according to the present invention thus may attain significantly higher gel strengths than the gel strengths of any hydroxyalkyl methyl celluloses known from the prior art having comparable kinds and levels of substitution and viscosity.

The at least one cellulose ether according to the present invention described above can be obtained by a multistage etherification process comprising:
a first stage comprising:
　i. treating cellulose pulp with a first amount of alkalizing agent, and
　ii. addition of at least one methylation agent to the cellulose pulp,
subsequent heating of the reaction mixture to a reaction temperature of 75° C. or more, and thereafter
at least one additional stage comprising:
　i. addition of an additional amount of alkalizing agent to the reaction mixture at a rate of less than 0.04 molar equivalents of alkalizing agent per mole of anhydroglucose units per minute, and, optionally for each individual additional stage,
　ii. addition of an additional amount of at least one methylation agent to the reaction mixture,
wherein before, after or concurrently with the addition of the alkalizing agent in the first stage at least one hydroxyalkylation agent, and optionally at least one alkylation agent different from a methylating agent, is added to the cellulose pulp, or, as the etherification of the cellulose pulp proceeds, to the partially reacted cellulose pulp.

The cellulose raw material for preparing the at least one cellulose ether according to the present invention is typically cellulose pulp obtained from cotton or wood, preferably wood pulp. It is typically provided in powder or chip form.

In the above-mentioned process the cellulose pulp or, as the reaction of cellulose pulp to the hydroxyalkyl methyl cellulose proceeds, the partially reacted cellulose pulp, is alkalized in two or more stages, preferably in two or three stages, in one or more reactors with an alkalizing agent. The alkalizing agent may be any strong base such as an alkali metal hydroxide, preferably sodium hydroxide, caustic soda or lime or a mixture of more than one of such strong bases, employed as an aqueous solution. Usually an aqueous solution of an alkali metal hydroxide is employed, preferably having an alkali metal hydroxide content of from 30 to 70 percent, more preferably from 35 to 60 percent, most preferably from 48 to 52 percent, based on the total weight of the aqueous solution of the alkali metal hydroxide.

In the first stage of the process the cellulose pulp is treated with a first amount of alkalizing agent, typically from 1.2 to 2.0 molar equivalents of alkalizing agent per mole of anhydroglucose units in the cellulose. The treatment can be conducted by any means known in the art such as by steeping in a bath or stirred tank or spraying. Uniform swelling and distribution of the alkalizing agent in the pulp may be achieved by mixing and agitation. In the first stage the rate of addition of the aqueous solution of the alkalizing agent to the cellulose pulp is not critical. It may be added in several portions, e.g. 2 to 4 portions, or continuously. During first stage alkalization, which usually lasts from 15 to 60 minutes, the temperature is typically maintained at 45° C. or below.

Moreover, at least one methylation agent such as methyl chloride and/or dimethyl sulfate is added to the cellulose pulp within the first stage of the process, before, after or concurrently with the first amount of alkalizing agent, preferably before the addition of the alkalizing agent. If added only in the first stage, the at least one methylation agent is typically added in an amount of 3.5 to 5.3 moles of methylating agent per mole of anhydroglucose units, but in but in any event in at least equimolar equivalent amount compared to the alkalizing agent added in the first stage. The at least one methylation agent used in the first stage may be pre-mixed with any conventional suspending agent. In this case, a mixture comprising from 20 to 50%, more preferably from 30 to 50%, of the suspending agent, based on the total weight of the suspending agent and the at least one methylation agent is preferably employed.

Once the cellulose has been treated with the first amount of alkalizing agent and the additions of the at least one methylation agent and possible further components of the first stage, preferably conducted also at a temperature of 45° C. or below, have been accomplished, the reaction mixture is heated, typically within 30 to 80 minutes, to a reaction temperature of at least 75° C., preferably in the range of 80-100° C., more preferably in the range of 80-90° C. Usually the reaction is then allowed to proceed at this reaction temperature for 10 to 30 minutes.

Subsequently the process comprises at least one additional stage comprising addition of an additional amount of alkalizing agent and, optionally for each individual additional stage, addition of an additional amount of the at least one methylation agent to the reaction mixture. The total amount of additional alkalizing agent added in total as aqueous solution within the at least one additional stage typically ranges from 1.0 to 2.9 molar equivalents of alkalizing agent per mole of anhydroglucose units. Preferably, the molar equivalent ratio between the amount of alkalizing agent added in the first stage and the amount of alkalizing agent added in total in the at least one additional stage is from 0.6:1 to 1.2:1. It is important to add the alkalizing agent in the at least one additional stage slowly to the reaction mixture, i.e. at a rate of less than 0.04, preferably less than 0.035, more preferably less than 0.03 molar equivalents of alkalizing agent per mole of anhydroglucose units per minute.

Typically the at least one methylation agent is used in a total amount in the range of 2 to 5.3 moles per mole of anhydroglucose units. If the at least one methylation agent is added not only in the first stage, but also in at least one additional subsequent stage, preferably in one additional stage, it is typically added in an amount of 2.0 to 2.5 moles of methylation agent per mole of anhydroglucose units in the first stage and in a total amount of 1.5 to 3.4 moles of methylation agent per mole of anhydroglucose units in the at least one additional stages. The molar equivalent ratio between the amount of the at least one methylation agent added in the first stage to the amount of the at least one methylation agent added in total in the at least one additional stages is preferably from 0.68:1 to 1.33:1. However, in any case, irrespective of whether the at least one methylation agent is used only in the first stage or also in at least one subsequent additional stage, it is generally used in an at least equimolar equivalent amount compared to the alkalizing agent with respect to each stage, for which an amount of the at least one methylation agent is added to the reaction mixture, and with respect to the total equivalent amounts of the at least one methylation agent and the alkalizing agent used in the process. The kind and rate of addition of the at least one methylation agent are not particularly limited, but preferably the at least one methylation agent is added continuously and/or at a rate in the range of 0.25 to 0.5 molar equivalents of methylation agent per mole of anhydroglucose units per minute. It is preferred to add the at least one methylation agent in each of the at least one additional stage, if used therein, to the reaction mixture prior to or during the addition of the additional amount of alkalizing agent of that stage in such a manner that the cellulose is continuously contacted with an at least equimolar equivalent amount of the at least one methylation agent compared to the alkalizing agent.

The alkalizing agent and/or the at least one methylation agent is added to the reaction mixture within the at least one additional stage typically at a temperature in the range between 50° C., preferably 55° C., more preferably 65° C., and 100° C., preferably 90° C., more preferably 85° C. The temperature of the reaction mixture may be adjusted before, during or after each stage by heating and/or cooling. After each additional stage the reaction mixture may be kept at a reaction temperature for a period of time for the reaction to proceed.

The at least one hydroxyalkylation agent added can be selected from any common hydroxyalkylation agents, which introduce by etherification reaction with the hydroxyl groups of the cellulose hydroxyalkoxy substituents specified as suitable for the cellulose ethers according to the invention above. For example epoxides such as ethylene oxide and/or propylene oxide can be used as hydroxyalkylation agents to introduce hydroxyethoxy and/or hydroxypropoxy substituents to the cellulose ether. A single hydroxyalkylation agent or more than one, preferably only one, hydroxyalkylation agent may be utilized. The at least one hydroxyalkylation agent is typically added in an amount in the range of 0.2 to 2.0 moles of the at least one hydroxyalkylation agent per mole of anhydroglucose units. It is advantageously added before the reaction mixture is heated to a temperature of 75° C. or more, i.e. at a temperature in the range of 20° C. to <75° C.

The at least one alkylation agent different from a methylating agent that is optionally employed can be selected from any known alkylation agents, which introduce by etherification reaction with the hydroxyl groups of the cellulose alkoxy substituents different from methoxy groups specified as suitable for the cellulose ethers according to the invention above. Non-limiting include ethyl chloride, ethyl bromide or ethyl iodide, diethyl sulphate and/or propyl chloride. Typically the at least one alkylation agent different from a methylating agent is added in an amount in the range of 0.5 to 6 moles of the at least one alkylation agent different from a methylating agent per mole of anhydroglucose units. It is advantageously added before the reaction mixture is heated to a temperature of 75° C. or more, i.e. at a temperature in the range of 20° C. to <75° C.

If desired, an inert organic solvent such as dimethyl ether can further be added to the reaction mixture as a diluent and a coolant. Optionally, the headspace of the reactor or reactors may be evacuated and/or purged with an inert gas such as nitrogen to control oxygen-catalyzed depolymerization of the alkali cellulose.

After accomplishment of the above described multistage etherification the obtained cellulose ether is typically further purified, dried and/or milled. Usually the cellulose ether is washed to remove salt and other reaction by-products. Any solvent in which the salt formed as a by-product of the etherification reaction is soluble may be employed, but water is usually utilized. The cellulose ether may be washed in the reactor, but is preferably washed in a separate washer located downstream of the reactor. Before or after washing, the cellulose ether may be stripped e.g. by exposure to steam to reduce the content of residual volatile organic compounds.

The cellulose ether can be dried to reduce moisture and the content of other volatile compounds to preferably 0.5 to 10.0 wt. %, more preferably 0.8 to 5.0 wt. % of water and other volatile compounds, based on the sum of the weight of the cellulose ether, water and other volatile compounds. Drying can be carried out using a conventional drier such as a tray drier, fluid bed drier, flash drier, agitation drier or tube drier. The reduced moisture and content of other volatile compounds enables the cellulose ether to be milled into particulate form.

The dried cellulose ether can be milled to particulates of desired size by any suitable means known in the art such as a ball mill, an impact pulverizer, knife grinder or air-swept impact mill. If desired, drying and milling can be conducted simultaneously.]

The cellulose ethers obtainable by the multistage etherification process may have extraordinary high gel strengths, comparatively low gelation temperatures, which can be in the range of 50-70° C., in combination with good dissolution characteristics at temperatures in the range of 10-50° C. This makes the cellulose ethers described above highly attractive to the use for construction applications according to the invention and as additives for building compositions according to the present invention.

The term "building composition" means any chemical composition such as cements (Portland, alumina, trass, slag, magnesia or phosphate cement), plaster of Paris and water glass employed in construction applications, i.e. which are used to form, install, protect, embellish, repair, paint, seal, coat or bind together structural construction elements that form or are used to erect, install, furnish and/or maintain buildings and/or other construction structures fixed to the ground. Structural construction elements are the individual solid components, which contribute to define the structure of a building or other construction structure fixed to the ground (e.g. a bridge) such as walls, rooftops, ceilings, floors, pillars, steel beams, wooden beams, bricks, tiles or insulation boards. The building composition of the present invention sets hydraulically and may for instance be a mortar, concrete, grout, plaster, stucco, adhesive, wall/ceiling texturizer, render or sealing slurry. Preferably the hydraulically setting building composition according to the invention is a dry mortar composition, a composition for water proofing membranes, a mineral coating for insulation systems like external thermal insulation composite systems (ETICS) or exterior insulation and finish systems (EIFS), a self leveling flooring mortar composition, a repair mortar, a tile grout mortar or a cement based tile adhesive (CBTA). More preferably it is a cement based tile adhesive.

The building composition of the present invention comprises at least one cellulose ether as set forth above. The cellulose ether may be present in an amount of 0.05 to 15 wt. %, preferably 0.1 to 10 wt. % and more preferably 0.2 to 1.0 wt. %, based on the total dry weight of the building composition.

Moreover, the building composition used in the methods of the present invention comprises at least one hydraulically setting material. The term "hydraulically setting material" means a material used in the field of construction, typically finely ground, which forms upon addition of an appropriate quantity of water a binding paste or slurry capable of hardening by hydration in air as well as under water. Typically the at least one hydraulically setting material is a cementitious material. Preferably it is a cement such as Portland cement, silica cement, alumina cement and/or fly ash cement. More preferably, the at least one hydraulically setting material is a Portland cement, particularly a Portland cement of type CEM I, II, III, IV and/or V and/or alumina cement. The building composition may comprise 5 wt. % or more, preferably 10 wt. % or more, more preferably 20 wt. % or more and at the same time 70 wt. % or less, preferably 50 wt. % or less, more preferably 45 wt. % or less, of the at least one inorganic material, based on the total dry weight of the building composition.

The building composition according to the invention may comprise in addition to the at least one cellulose ether set forth above and the at least one hydraulically setting material optionally at least one filler and/or further additives.

Commonly suitable fillers are inorganic particulates with dimensions of 5 mm or less. The at least one filler, if present, is preferably selected from the group of silica sand, limestone, chalk, marble, clay, alumina, talc, barite, hollow microspheres, glass and aluminum silicates such as expanded clay, expanded glass and porous fillers based on natural minerals such as foam, pumice and volcanic cinder, and bulking vermiculite. The building composition can comprise 1 wt. % or more, preferably 50 wt. % or more, more preferably 60 wt. % or more and at the same time 70 wt. % or less, more preferably 65 wt. % or less of the at least one filler, based on the total dry weight of the building composition.

The optional further additives are different from the at least one cellulose ether according to the present invention and can be any conventional additives used in building compositions of the prior art such as accelerators, retardants, re-dispersible powders (RDPs), synthetic and/or natural polymers, dispersants, surfactants, pigments, water-reducing agents, defoamers, air entraining agents, corrosion inhibitors and/or polymeric superplasticizers. The building composition of the invention may comprise in total between 0.001 wt. % and 5 wt. % of these additives, based the total dry weight of the building composition.

As accelerator any material capable of accelerating the hydration of a hydraulically setting material can be used. Suitable accelerators are for instance inorganic salts such as metal chlorides, nitrites, nitrates, sulfates, hydroxides, carbonates, with the metal e.g. being sodium or calcium, water glass, alumina or calcium salts of organic acids such as calcium formiate and calcium acetate.

One or more retarders may be added to retard the setting process, if desired. Examples of retarders comprise hydroxycarboxylic acids such as citric acid or gluconic acid and inorganic salts thereof, saccharides such as glucose, fructose or saccharose, oligosaccharides or boric acid.

Re-dispersible powders are commonly prepared by emulsion polymerization and subsequent spray drying in the presence of various additives such as protective colloids and/or anti-caking agents. The RDPs are preferably made of homopolymers, copolymers or terpolymers obtained by polymerization or copolymerization of at least one monomer selected from the group of styrene, butadiene, vinyl acetate, vinyl versatate, vinyl propionate, vinyl laurate, vinyl chloride, vinylidene chloride, ethylene and acrylates. Examples include vinyl ester-ethylene copolymers such as ethylene/vinylacetate copolymer, vinyl acetate/vinyl versatate copolymer and styrene/acrylic copolymer. The RDPs may be added to the building composition as powder or as dispersion of polymeric particles in a solvent such as water.

The cellulose ether according to this invention can be used as the only thickener, but it is also possible to use one or more synthetic and/or natural polymers as additional thickeners to control the rheology of the building composition. Examples of suitable synthetic polymers include polyvinyl alcohols, polyvinyl esters, polyethylene oxides, polyethylene glycols, polyacrylamides, copolymers of vinyl acetate, vinyl chloride and vinyl laurate and acrylates, wherein polyacrylamides are preferable. As natural polymers e.g. pectin, gelatine, casein, guar gum, starch derivatives and/or cellulose derivatives known in the prior art, starch ethers being preferable, can be employed in the building composition of the present invention. If added to the building composition of the invention, the amount of synthetic polymeric thickeners can be in the range of 0.01 to 10 wt. % and/or the amount of natural polymeric thickener can be in the range of 10 wt. % to 50 wt. %, based on the weight of the cellulose ether according to the invention.

It has surprisingly been found that hydraulically setting building compositions comprising at least one cellulose ether according to the present invention achieve considerably higher adhesion strengths after heat storage conditioning according to EN 1348 (Technical Committee CEN/TC 67 "Ceramic tiles" (November 2007)) and that setting starts within less time, is less abrupt and accomplished within shorter time than in the case of analogous building compositions comprising conventional comparable hydroxyalkyl methyl celluloses. Other application properties of the building composition such as adhesion strength under other storage conditions, workability, compliance with different substrate materials, slip resistance, open time, correction time and pot life may be improved as well or are at least not impaired significantly. Thus, at least one cellulose ether according to the present invention may be used in a hydraulically setting building composition, preferably a hydraulically setting building composition selected from the group of a dry mortar composition, a composition for water proofing membranes, a mineral coating for insulation systems like external thermal insulation composite systems (ETICS) or exterior insulation and finish systems (EIFS), a self leveling flooring mortar composition, a repair mortar, a tile grout mortar or a cement based tile adhesive (CBTA). More preferably it is used in a cement based tile adhesive. This use may especially be for improving at least the adhesion strength after heat storage conditioning and/or the setting characteristics of the hydraulically setting building composition. Accordingly, the cellulose ethers according to the invention aid to increase the performance of building compositions and/or to save costs by allowing use of cost-intensive cellulose ether additives at lower levels in the formulation of building compositions without impairing their application properties. The at least one cellulose ether of the present invention may be incorporated according to the invention into a building composition according to conventional methods e.g. those described in EN 1346 (Technical Committee CEN/TC 67 "Ceramic tiles" (November 2007)) or EN 1348 (Technical Committee CEN/TC 67 "Ceramic tiles" (November 2007)). For instance the building composition of the present invention can be prepared by thorough mixing of the at least one cellulose ether with the at least one hydraulically setting material and any other optional components, if used, as specified above. Preferably a homogeneous dry blend is prepared by mixing of all solid components. In this case any liquid components such as a polymer dispersion, if any, and an adequate amount of water are added to the dry blend and thoroughly mixed therewith just before the application of the building composition. The amount of added water is commonly adjusted to yield the desired consistency of the building composition for the respective application. Typically water is added in an amount of 10 to 40 parts by weight per 100 parts by weight of the resulting wet mixture.

In the method according to the invention of applying a building composition to at least one structural composition element, any building composition according to the present invention as described above can be employed. Such building composition may be provided as explained in the foregoing. The step of contacting the structural composition element with the building composition can be carried out by various ways known in the art, depending on the kind of application. For instance, without being limiting, the building composition may be contacted with the structural composition element manually or automatically, by means of a trowel, spatula, brush, roller, knife applicator or by pouring, dipping or the like. In the particular case of laying tiles, the building composition will typically be applied to one major side of the tiles and/or the floor and/or wall where the tiles shall be laid on, e.g. by means of a trowel. The subsequent step of allowing the building composition to set comprises providing sufficient time to the building composition in the intended final spatial arrangement with the at least one structural composition element to harden and/or toughen. Typically the setting is accomplished on a time scale of a few hours.

Some embodiments of the invention will be described in the following examples in detail. All percentages are by weight unless explicitly specified otherwise. "EN" stands for European Norm and designates a test method as a prefix to the test method number. The test method is the most current test method as of the priority date of this document unless stated otherwise.

EXAMPLE 1

Hydroxyethyl methyl cellulose (HEMC) of the present invention was produced according to the following procedure. Finely ground wood cellulose pulp was loaded into a jacketed, agitated reactor. The reactor was evacuated and purged with nitrogen to remove oxygen and then evacuated again. The reaction was carried out in two subsequent stages. In the first stage 5.8 moles of dimethyl ether and 2.3 moles of methyl chloride per mole of anhydroglucose units in the cellulose were sprayed onto the cellulose and the temperature was adjusted to 40° C. After this addition a 50 wt. % aqueous solution of sodium hydroxide was added at 40° C. in an amount of 1.8 moles of sodium hydroxide per mole of anhydroglucose units over 20 minutes. After stirring the mixture for 5 min at 40° C., 0.3 moles of ethylene oxide per mole of anhydroglucose units were added to the reactor over 8 min. The contents of the reactor was then heated within 60 min to 80° C. After having reached 80° C., the first stage reaction was allowed to proceed for 25 min at 80° C.

The second stage of the reaction was started by addition of methyl chloride in an amount of 2.5 molar equivalents of methyl chloride per mole of anhydroglucose units over 5 min at 80° C. to the reaction mixture resulting from the first stage reaction. Subsequently a 50 wt. % aqueous solution of sodium hydroxide was added at 80° C. in an amount of 1.8 moles of sodium hydroxide per mole of anhydroglucose units over a time period of 60 min. The rate of addition was 0.03 moles of sodium hydroxide per mole of anhydroglucose units per minute. After the second stage addition of sodium hydroxide was completed the contents of the reactor was kept at a temperature of 80° C. for additional 90 min.

Subsequently, the reactor was vented and cooled down to 50° C. The contents of the reactor was removed and transferred to a tank containing hot water. The crude HEMC was then neutralized with formic acid and washed with hot water until being chloride free, as assessed by an $AgNO_3$ flocculation test. The purified HEMC was then cooled to room temperature, dried at 55° C. in an air-swept drier and subsequently ground using an Alpine UPZ mill using a 0.3 mm screen.

EXAMPLE 2

Another HEMC of the present invention was prepared as described for Example 1 except that the amount of NaOH added to the reaction mixture in the first stage was 1.6 moles of sodium hydroxide per mole of anhydroglucose units.

EXAMPLE 3

Another HEMC according to the present invention was prepared as described for Example 1 except that the amount of sodium hydroxide added to the reaction mixture in the first stage was 1.6 moles of sodium hydroxide per mole of anhydroglucose units and the amount of ethylene oxide added to the reaction mixture was 0.42 moles of ethylene oxide per mole of anhydroglucose units.

EXAMPLE 4

Another HEMC according to the present invention was prepared as described for Example 1 except that the amount of sodium hydroxide added to the reaction mixture in the first stage was 1.4 moles of sodium hydroxide per mole of anhydroglucose units, the amount of sodium hydroxide added to the reaction mixture in the second stage was 2.0 moles of sodium hydroxide per mole of anhydroglucose units and the amount of ethylene oxide added to the reaction mixture was 0.42 moles of ethylene oxide per mole of anhydroglucose units.

EXAMPLE 5

Hydroxypropyl methyl cellulose (HPMC) of the present invention was produced according to the following procedure. Finely ground wood cellulose pulp was loaded into a jacketed, agitated reactor. The reactor was evacuated and purged with nitrogen to remove oxygen and then evacuated again. The reaction was carried out in two subsequent stages. In the first stage a 50 wt. % aqueous solution of sodium hydroxide was added in an amount of 1.8 moles of sodium hydroxide per mole of anhydroglucose units to the cellulose pulp over 5 min at 40° C. After stirring the mixture for 30 min at 40° C. 1.5 moles of dimethyl ether and 2.3 moles of methyl chloride per mole of anhydroglucose units were sprayed onto the cellulose at 40° C. After this addition, 0.4 moles of propylene oxide per mole of anhydroglucose units were added within 5 min to the reactor. The contents of the reactor was then heated within 60 min to 80° C. After having reached 80° C., the first stage reaction was allowed to proceed for 5 min at this temperature. Subsequently the reactor contents was cooled down to 55° C. within 20 min.

The second stage of the reaction was started by addition of methyl chloride in an amount of 2.3 molar equivalents of methyl chloride per mole of anhydroglucose units over 5 min at 55° C. to the reaction mixture resulting from the first stage reaction. Subsequently a 50 wt. % aqueous solution of sodium hydroxide was added at 55° C. in an amount of 2.6 moles of sodium hydroxide per mole of anhydroglucose units over a time period of 90 min. The rate of addition was 0.03 moles of sodium hydroxide per mole of anhydroglucose units per minute. After the second stage addition of sodium hydroxide was completed the contents of the reactor was heated to 80° C. in 20 min and then kept at this temperature for 90 min.

Subsequent purification, washing and drying of the obtained cellulose ether was conducted as described for Examples 1-4.

For comparative purposes the following hydroxyethyl methyl celluloses were prepared according to prior art processes.

COMPARATIVE EXAMPLE A

Finely ground wood cellulose pulp was loaded into a jacketed, agitated reactor. The reactor was evacuated and purged with nitrogen to remove oxygen and then evacuated again. The reaction was carried out in two subsequent stages. In the first stage 5.8 moles of dimethyl ether and 2.74 moles of methyl chloride per mole of anhydroglucose units in the cellulose were sprayed onto the cellulose and the temperature was adjusted to 65° C. After this addition a 50 wt. % aqueous solution of sodium hydroxide was added in an amount of 2.28 moles of sodium hydroxide per mole of anhydroglucose units over 18 min. While adding the sodium hydroxide solution the reaction mixture was cooled down to 46° C. After stirring the mixture for 2 min at 46° C., 0.3 moles of ethylene oxide per mole of anhydroglucose units were added to the reactor over 8 min. The contents of the reactor was then heated within 70 min to 70° C.

The second stage of the reaction was then started by addition of methyl chloride in an amount of 1.86 molar equivalents of methyl chloride per mole of anhydroglucose units over 5 min at 70° C. to the reaction mixture resulting from the first stage reaction. Subsequently a 50 wt. % aqueous solution of sodium hydroxide was added at 70° C. in an amount of 1.1 moles of sodium hydroxide per mole of anhydroglucose units over a time period of 30 min. The rate of addition was 0.036 moles of sodium hydroxide per mole of anhydroglucose units per minute. After the second stage addition of sodium hydroxide was completed the contents of the reactor was heated from 70° C. to a temperature of 80° C. within 20 min and then kept at 80° C. for additional 50 min.

Subsequent purification, washing and drying of the obtained cellulose ether was conducted as described for Examples 1-4.

COMPARATIVE EXAMPLE B

The preparation was according to the process described for Comparative Example A except that the amount of ethylene oxide added to the reaction mixture was 0.45 moles of ethylene oxide per mole of anhydroglucose units.

COMPARATIVE EXAMPLE C

The preparation was conducted as described for Example 3 with respect to the first stage. After the first stage reaction was allowed to proceed at 80° C. for 25 min the reactor was cooled down to 60° C. Then the second stage of the reaction was started by adding methyl chloride in an amount of 2.5 molar equivalents of methyl chloride per mole of anhydroglucose units over 5 min at 60° C. to the reaction mixture resulting from the first stage reaction. Subsequently a 50 wt. % aqueous solution of sodium hydroxide was added at 60° C. in an amount of 1.8 moles of sodium hydroxide per mole of anhydroglucose units over a time period of 90 min. The rate of addition was 0.02 moles of sodium hydroxide per mole of anhydroglucose units per minute. After the second stage addition was completed the contents of the reactor was heated to 80° C. within 20 min and then kept at a temperature of 80° C. for 70 min. The further processing after the reaction was as described for Examples 1-5 and Comparative Examples A and B.

COMPARATIVE EXAMPLE D

Methocel 228, a commercial hydroxypropyl methyl cellulose available from The Dow Chemical Company was used for comparative purposes.

The prepared cellulose ethers of the Examples and Comparative Examples were analyzed as follows.
Preparation of Cellulose Ether Solutions Homogenous 1.5 wt. % aqueous solutions of the prepared cellulose ethers were obtained as follows: 3 g of the respective cellulose ether (under consideration of the water content of the cellulose ether powder) were suspended in 197 g water at 70° C. with an overhead laboratory stirrer operated at 700 rpm for 10 min. The solution was then cooled to 2° C. and held at this temperature for 5 hours to complete the dissolution process. During these 5 hours the solution was stirred at 500-1000 rpm and water lost due to evaporation was refilled. The solution was then stored in a refrigerator over night. Prior to the further analysis the cold solutions were stirred for 15 min at 100 rpm.
Viscosity Measurement The viscosities of the thus obtained 1.5 wt. % aqueous cellulose ether solutions were measured in a Haake RS600 rheometer (Thermo Fischer Scientific, Karlsruhe, Germany) with a cone and plate geometry)(CP-60/2° at a temperature of 20° C. and at a shear rate of 2.55 s$^{-1}$.
Determination of DS(methoxy) and MS(hydroxyalkoxy)

The determination of the degree of substitution of methoxy groups (DS) and the molar substitution of hydroxyalkoxy groups (MS) of the prepared cellulose ethers was carried out by Zeisel cleavage with hydrogen iodide followed by gas chromatography according to the method described by G. Bartelmus and R. Ketterer, Z. Anal. Chem. 286 (1977), 161-190.
Determination of $S_{23}/S_{26}$ The determination of $S_{23}/S_{26}$ for the prepared hydroxyalkyl methyl celluloses was conducted as follows: 10-12 mg of the cellulose ether were dissolved in 4.0 mL of dry analytical grade dimethyl sulfoxide (DMSO) (Merck, Darmstadt, Germany, stored over 0.3 nm molecular sieve beads) at 90° C. under stirring and then cooled down to room temperature again. The solution was left stirring at room temperature over night to ensure complete solubilization. The entire reaction including the solubilization of the cellulose ether was performed using a dry nitrogen atmosphere. After solubilization, the dissolved cellulose ether was transferred to a 22 mL screw cap vial. Powdered sodium hydroxide (freshly pestled, analytical grade, Merck, Darmstadt, Germany) and ethyl iodide (for synthesis, stabilized with silver, Merck-Schuchardt, Hohenbrunn, Germany) was added in a thirty fold molar equivalent excess of the reagents sodium hydroxide and ethyl iodide with reference to the hydroxyl groups of the anhydroglucose units and the solution was vigorously stirred under nitrogen in the dark for three days at ambient temperature. The perethylation was repeated by addition of the threefold amount of the reagents sodium hydroxide and ethyl iodide compared to the first addition of these reagents and further stiffing at room temperature for additional two days. The reaction mixture was diluted with up to 1.5 mL DMSO to ensure good mixing during the course of the reaction. Subsequently, 5 mL of a 5 wt. % aqueous sodium thiosulphate solution were poured into the reaction mixture and the obtained solution was then extracted three times with 4 mL of dichloromethane. The combined extracts were washed three times with 2 mL of water and then dried with anhydrous sodium sulphate. After filtration the solvent was removed in a gentle stream of nitrogen and the perethylated sample stored at 4° C. until further sample preparation.

Hydrolysis of about 5 mg of the perethylated sample was performed under nitrogen in a 2 mL screw cap vial with 1 mL of 90% aqueous formic acid under stirring at 100° C. for 1 hour. The acid was removed in a stream of nitrogen at 35-40° C. and the hydrolysis was repeated with 1 mL of 2 M aqueous trifluoroacetic acid for 3 hours at 120° C. in an inert nitrogen atmosphere under stirring. After completion the acid was removed to dryness in a stream of nitrogen at ambient temperature using 1 mL of toluene for co-distillation.

The residues of the hydrolysis were reduced with 0.5 mL of 0.5 M sodium borodeuteride in 2 N aqueous ammonia solution (freshly prepared) for 3 hours at room temperature under stirring. The excess reagent was destroyed by drop wise addition of 200 µL of concentrated acetic acid. The resulting solution was evaporated to dryness in a stream of nitrogen at 35-40° C. and subsequently dried in vacuum for 15 min at room temperature. The viscous residue was dissolved in 0.5 mL of 15% acetic acid in methanol and evaporated to dryness at room temperature. This was done five times and repeated four times with pure methanol. After the final evaporation, the sample was dried in vacuum overnight at room temperature.

The residue of the reduction was acetylated with 600 µL of acetic anhydride and 150 µL of pyridine for 3 hours at 90° C. After cooling the sample vial was filled with toluene and evaporated to dryness in a stream of nitrogen at room temperature. The residue was dissolved in 4 mL of dichloromethane, poured into 2 mL of water and extracted with 2 mL of dichloromethane. The extraction was repeated three times. The combined extracts were washed three times with 4 mL of water and dried with anhydrous sodium sulphate. The dried dichloromethane extract was subsequently submitted to GC analysis.

Gas-liquid (GLC) chromatographic analyses were performed with Hewlett Packard 5890A and 5890A Series II gas chromatographs (Gerstel GmbH&Co. KG, Mülheim (Ruhr)) equipped with J&W capillary columns DB5, 30 m, 0.25 mm inner diameter, 0.25 µm phase layer thickness operated with 1.5 bar helium carrier gas. The gas chromatograph was programmed with a temperature profile that held constant at 60° C. for 1 min, heated up at a rate of 20° C./min to 200° C., heated further up with a rate of 4° C./min to 250° C. and heated further up with a rate of 20° C./min to 310° C. where it was held constant for another 10 min. The injector temperature was set to 280° C. and the temperature of the flame ionization detector (FID) was set to 300° C. 1 µL of the samples was injected in the splitless mode at 0.5 min valve time. Data were acquired and processed with a LabSystems Atlas work station.

Quantitative monomer composition data were obtained from the peak areas measured by GLC with FID detection. Molar responses of the monomers were calculated according to the effective carbon number (ECN) concept, but modified ECN increments as shown in Table 1 were used. The effective carbon number concept has been described by Ackman (R. G. Ackman, J. Gas Chromatogr., 2 (1964) 173-179 and R. F. Addison, R. G. Ackman, J. Gas Chromatogr., 6 (1968) 135-138) and applied to the quantitative analysis of partially alkylated alditol acetates by Sweet et. al (D. P. Sweet, R. H. Shapiro, P. Albersheim, Carbohyd. Res., 40 (1975) 217-225).

TABLE 1

| ECN increments used for ECN calculations. | |
|---|---|
| Carbon atom | ECN increment |
| hydrocarbon | 100 |
| primary alcohol | 55 |
| secondary alcohol | 45 |

In order to correct for the different molar responses of the monomers, the peak areas were multiplied by molar response factors ($MRF_{monomer}$), which are defined as the response relative to the 2,3,6-Me monomer, i.e. monomer units corresponding to anhydroglucose units wherein the hydroxyl groups at the 2-, 3- and 6-positions of the anhydroglucose unit are substituted by methoxy groups:

$$MRF_{monomer} = ECN_{2,3,6-Me}/ECN_{monomer} \quad (2).$$

The 2,3,6-Me monomer was chosen as reference since it was present in all samples analyzed in the determination of $S_{23}/S_{26}$.

The molar fraction of each monomer and thereby each corresponding anhydroglucose unit with a distinct substitution was calculated by dividing the respective corrected peak area by the sum of corrected peak areas. $S_{23}$ and $S_{26}$ were then calculated according to the following equations:

$$S_{23}=[23\text{-}Me+23\text{-}Me\text{-}6\text{-}HAMe+23\text{-}Me\text{-}6\text{-}HA+23\text{-}Me\text{-}6\text{-}HAHAMe+23\text{-}Me\text{-}6\text{-}HAHA] \quad (3)$$

and $$S_{26}=[26\text{-}Me+26\text{-}Me\text{-}3\text{-}HAMe+26\text{-}Me\text{-}3\text{-}HA+26\text{-}Me\text{-}3\text{-}HAHAMe+26\text{-}Me\text{-}3\text{-}HAHA] \quad (4),$$

wherein $S_{23}$ is the sum of the molar fractions of anhydroglucose units, wherein
  a) the two hydroxyl groups at the 2- and 3-positions of the anhydroglucose unit are each substituted by a methoxy group and the hydroxyl group at the 6-position is not substituted (23-Me)
  b) the two hydroxyl groups at the 2- and 3-positions of the anhydroglucose unit are each substituted by a methoxy group and the hydroxyl group at the 6-position is substituted by a methylated hydroxyalkoxy group (=23-Me-6-HAMe) or by a methylated side chain comprising two hydroxyalkoxy groups (23-Me-6-HAHAMe)
  c) the two hydroxyl groups at the 2- and 3-positions of the anhydroglucose unit are each substituted by a methoxy group and the hydroxyl group at the 6-position is substituted by a hydroxyalkoxy group (=23-Me-6-HA) or by a side chain comprising two hydroxyalkoxy groups (=23-Me-6-HAHA);

and $S_{26}$ is the sum of the molar fractions of anhydroglucose units, wherein
  a) the two hydroxyl groups at the 2- and 6-positions of the anhydroglucose unit are each substituted by a methoxy group and the hydroxyl group at the 3-position is not substituted (26-Me)
  b) the two hydroxyl groups at the 2- and 6-positions of the anhydroglucose unit are each substituted by a methoxy group and the hydroxyl group at the 3-position is substituted by a methylated hydroxyalkoxy group (=26-Me-3-HAMe) or by a methylated side chain comprising two hydroxyalkoxy groups (26-Me-3-HAHAMe)
  c) the two hydroxyl groups at the 2- and 6-positions of the anhydroglucose unit are each substituted by a methoxy group and the hydroxyl group at the 3-position is substituted by a hydroxyalkoxy group (26-Me-3-HA) or by a side chain comprising two hydroxyalkoxy groups (26-Me-3-HAHA).

The contribution of anhydroglucose units having side chains comprising more than two hydroxyalkoxy groups was negligible, i.e. below the detection limit of the GLC-FID analysis.

Determination of Temperature Dependent Precipitation and/or Gelation Properties

To characterize the temperature dependent precipitation and/or gelation properties of the prepared cellulose ethers a 1.5 wt. % aqueous solution of each cellulose ether, prepared as set forth above, was analyzed using an Anton Paar Physica MCR 501 rheometer (Ostfildern, Germany) with a Cup & Bob set-up (CC-27) and a peltier temperature control system operated in oscillation shear flow. The measurements were performed at a constant frequency of 2 Hz and a constant strain (deformation amplitude) of 0.5% from 10° C. to 85° C. with a heating rate of 1° C./min at a data collection rate of 4 data points per min. From the oscillation measurements the storage modulus G' and the loss modulus G" were obtained.

The temperature dependent precipitation and gelation properties of the cellulose ethers were obtained from a plot of log G' and log G" versus normal (non-log) temperature in degrees Celsius. The precipitation temperature was determined as the temperature corresponding to the intersection of two tangents in the log G' versus normal (non-log) temperature plot as illustrated in FIG. 1, postulated that a pronounced drop of G' to a local minimum was observed within the respective plot. The first tangent was fitted to the steady decrease of G' with increasing temperature in a temperature interval from 20° C. below the inflection point of the pronounced drop of G' to the local minimum up to 3° C. below the temperature corresponding to the inflection point of the pronounced drop of G' to the local minimum. The second tangent was fitted to the drop of G' to the local minimum in a temperature interval of 1° C. being centered to the inflection point of sharp G' decrease. Some of the cellulose ethers according to the invention exhibited no pronounced drop of G' to a local minimum in the log G' versus normal (non-log) temperature plot. In these cases, a precipitation temperature was not determined and considered as not detectable. A drop of G' to a local minimum was considered to be pronounced, i.e. allowing for a determination of a precipitation temperature, if the local minimum was less than half of the value of the first tangent extrapolated to the same temperature. The gelation temperature was determined as the temperature at which G'/G"=1. Some cellulose ethers of the present invention showed two points of cross-over of G' and G'. In such case the gelation temperature was determined as the temperature where G'/G"=1, for which at a temperature being 1° C. lower, G" was greater than G. The gel strength was determined as storage modulus G' of the 1.5 wt. % aqueous solution of the cellulose ether at a temperature of 80° C. for which G'/G">1 is below this temperature of 80° C., i.e. a gel was formed.

The determined substitution parameters and physical properties of the hydroxyalkyl methyl celluloses of Examples 1 to 5 and of Comparative Examples A to D are listed in Table 2 below.

The results in Table 2 clearly indicate that the cellulose ethers according to the invention with $[S_{23}/S_{26}-0.2*MS]$ of 0.38 or less (Examples 1-5) have significantly higher gel strengths G' and lower gelation temperatures than conventional hydroxyalkyl methyl celluloses with a comparable DS, MS and viscosity, which are characterized by $[S_{23}/S_{26}-0.2*MS]$ above 0.38 (Comparative Examples A-D).

Among the HEMCs with a comparable DS and MS, i.e. on the one hand Examples 1-2 and Comparative Example 1 and on the other hand Examples 3-4 and Comparative Examples B-C, a steady decrease of the gelation temperature and a steady increase of the gel strength G' with decreasing values of $[S_{23}/S_{26}-0.2*MS]$ are observed.

Moreover no precipitation temperature was detectable for Examples 1-5, whereas the conventional HEMCs (Comparative Examples A-C) and HPMC (Comparative Example D) each exhibit a precipitation temperature, which is 3° C. or more lower than the respective gelation temperature.

TABLE 2

Substitution parameters and physical properties of the cellulose ethers of Examples 1-5 and Comparative Examples A-D

| | CE | DS (methoxy) | MS (hydroxyalkoxy) | $S_{23}/S_{26}-$ 0.2 * MS | Viscosity at 20° C. (mPa·s) [1] | Precipitation temperature (° C.) [1] | Gelation temperature (° C.) [1] | Loss modulus G" at 80° C. (Pa) [1] | Storage modulus G' at 80° C. (Pa) [1] |
|---|---|---|---|---|---|---|---|---|---|
| Example 1 | HEMC | 1.92 | 0.18 | 0.36 | 1750 | —[2] | 65.5 | 8.9 | 288 |
| Example 2 | HEMC | 1.90 | 0.20 | 0.33 | 1810 | —[2] | 58.7 | 9.5 | 307 |
| Example 3 | HEMC | 1.90 | 0.26 | 0.36 | 1700 | —[2] | 63 | 6.5 | 124 |
| Example 4 | HEMC | 1.88 | 0.27 | 0.31 | 1050 | —[2] | 57.2 | 4.9 | 143 |
| Example 5 | HPMC | 2.06 | 0.20 | 0.26 | 1490 | —[2] | 56.2 | 19.8 | 567 |
| Comparative Example A | HEMC | 1.80 | 0.15 | 0.46 | 1410 | 69.7 | 72.7 | 2.2 | 24.5 |
| Comparative Example B | HEMC | 1.81 | 0.23 | 0.49 | 1240 | 68.5 | 75 | 0.7 | 2.5 |
| Comparative Example C | HEMC | 2.00 | 0.25 | 0.41 | 1540 | 64.2 | 68.2 | 1.8 | 22 |
| Comparative Example D | HPMC | 1.88 | 0.22 | 0.39 | 1040 | 61.0 | 64.2 | 0.5 | 3.5 |

[1] measured as 1.5 wt. % aqueous solution
[2] not detectable

EXAMPLES 6-10, COMPARATIVE EXAMPLES E-H

Preparation of CBTA Compositions

Ordinary Portland cement of type CEM I 52,5 R (Milke, Germany), silica sand of types Quarzsand F 32 and Quarzsand F 36 (Quarzwerke Frechen, Germany), re-dispersible powder DLP 2000 (DWC, Germany) as a co-binder, calcium formiate Mebofix 50 as accelerator (Lanxess, Germany) and one cellulose ether selected out of Examples 1-5 or Comparative Examples A-D, were each mixed in amounts corresponding to the weight percentages of the components given in Table 3 until a homogeneous dry mixture was obtained. Subsequently, water was added to the dry mixture in an amount yielding a fixed water to solid ratio of 0.205 based on weight. It was mixed again until a homogeneous wet mixture was obtained, which was then directly used in the following application tests unless stated otherwise.

The percentages (%) in Table 3 concerning the content of the cement, the silica sands, RDP, calcium formiate and the cellulose ether are by weight based on the total dry weight of the hydraulically setting composition. The percentages (%) concerning the single cellulose ethers (Examples 1-5, Comparative Examples A-D) state the composition of the cellulose ether component in the formulation based on the total weight of the cellulose ether component in the formulation (corresponding to 0.40 wt. % of the total dry formulation).

Application Tests

The cement based tile adhesive compositions prepared as described beforehand were tested for adhesion strength after heat storage conditioning according to EN 1348 (Technical Committee CEN/TC 67 "Ceramic tiles" (November 2007)).

The setting times of the cement based tile adhesive compositions were determined by Vicat needle test using a Dettki AVM-14-PNS penetrometer (Dettki Messautomatisierung, Epfendorf, Germany). To this end 82 g of water were filled in a mixing bowl, 400 g of a homogeneous mixture of the dry components of the respective CBTA composition according to Table 3 were added and mixed for 30 s in a mechanical mixer. Subsequently material adhering to the walls and rim outside of the mixing zone of the mixing bowl were scraped off with a spatula and added again to the mixing zone within 60 s. Afterwards, mechanical mixing was resumed for 60 s and then for another 15 s. The resulting mixture was then filled in a polystyrene cup with interior diameter of 93 mm and a depth of 38 mm taking care not to introduce air voids and removing overfilled material with a spatula to create a smooth flat surface. Subsequently the sample surface was covered with paraffin oil to suppress the formation of skin and to prevent adhesion of the adhesive to the test needle. The sample was then placed in the appropriate holder of the Dettki AVM-14-PNS penetrometer and the penetration depth measured automatically as a function of time with a test needle as described in sections 6.1 and 6.2 of DIN EN 196-3:1994. The measured penetration depth is plotted versus time, wherein the time when the mixing was started is considered as zero. By linear interpolation the initial setting time is determined as the time in minutes for which a penetration depth of 36 mm is reached. Analogously, the final setting time is determined as the time in minutes for which a penetration depth of 2 mm is reached. The difference between initial and final setting time is the total setting time.

The obtained results of adhesion strength after heat storage conditioning and the setting characteristics of the CBTAs of Examples 6-10 and Comparative Examples E-H are included in Table 3.

Table 3 shows that among formulations, which comprise comparable hydroxyalkyl methyl celluloses, i.e. of the same kind (HEMC or HPMC, respectively) having a comparable DS and MS (on the one hand Examples 6-7 and Comparative Example E, secondly Examples 8-9 and Comparative Examples F-G and thirdly Example 10 and Comparative Example H) those formulation containing cellulose ethers according to the invention achieve significantly higher adhesion strengths after heat storage conditioning and setting starts faster, is less abrupt and accomplished in less total time compared to formulations containing cellulose ethers according to the prior art. The cellulose ethers according to the invention thus yield, when used as an additive, hydraulically setting compositions with improved performance.

TABLE 3

Formulations, adhesion strength and setting times of the prepared CBTA compositions (all percentages and ratios by weight)

|  | E | F | G | H | 6 | 7 | 8 | 9 | 10 |
|---|---|---|---|---|---|---|---|---|---|
| OPC CEM I 52,5 R (Milke) [wt. %] | 35.0% | 35.0% | 35.0% | 35.0% | 35.0% | 35.0% | 35.0% | 35.0% | 35.0% |
| Quarzsand F32 [wt. %] | 30.80% | 30.80% | 30.80% | 30.80% | 30.80% | 30.80% | 30.80% | 30.80% | 30.80% |
| Quarzsand F36 [wt. %] | 30.80% | 30.80% | 30.80% | 30.80% | 30.80% | 30.80% | 30.80% | 30.80% | 30.80% |
| DLP 2000 [wt. %] | 2.5% | 2.5% | 2.5% | 2.5% | 2.5% | 2.5% | 2.5% | 2.5% | 2.5% |
| Calcium formiate [wt. %] | 0.5% | 0.5% | 0.5% | 0.5% | 0.5% | 0.5% | 0.5% | 0.5% | 0.5% |
| Cellulose ether [wt. %] | 0.40% | 0.40% | 0.40% | 0.40% | 0.40% | 0.40% | 0.40% | 0.40% | 0.40% |
| Cellulose ether component consisting of: |  |  |  |  |  |  |  |  |  |
| Comparative Example A | 100.0% |  |  |  |  |  |  |  |  |
| Comparative Example B |  | 100.0% |  |  |  |  |  |  |  |
| Comparative Example C |  |  | 100.0% |  |  |  |  |  |  |
| Comparative Example D |  |  |  | 100% |  |  |  |  |  |
| Example 1 |  |  |  |  | 100.0% |  |  |  |  |
| Example 2 |  |  |  |  |  | 100.0% |  |  |  |
| Example 3 |  |  |  |  |  |  | 100.0% |  |  |
| Example 4 |  |  |  |  |  |  |  | 100.0% |  |
| Example 5 |  |  |  |  |  |  |  |  | 100% |
| water/solid ratio [wt./wt.] | 0.205 | 0.205 | 0.205 | 0.205 | 0.205 | 0.205 | 0.205 | 0.205 | 0.205 |

TABLE 3-continued

Formulations, adhesion strength and setting times of the prepared CBTA compositions (all percentages and ratios by weight)

| | E | F | G | H | 6 | 7 | 8 | 9 | 10 |
|---|---|---|---|---|---|---|---|---|---|
| adhesion strength according to EN 1348 [N/mm$^2$] | | | | | | | | | |
| heat conditioning | 0.78 | 0.80 | 1.10 | 1.20 | 1.13 | 1.50 | 1.62 | 1.59 | 1.31 |
| setting time according to Vicat test [min.] | | | | | | | | | |
| initial | 305 | 336 | 273 | 272 | 246 | 245 | 217 | 218 | 246 |
| final | 363 | 393 | 307 | 317 | 319 | 310 | 289 | 279 | 307 |
| total | 58 | 57 | 34 | 45 | 73 | 65 | 72 | 61 | 61 |

The invention claimed is:

1. A building composition comprising at least one hydraulically setting material and at least one cellulose ether, wherein at least a part of the hydroxyl groups of the cellulose backbone of the at least one cellulose ether are substituted by methoxy groups and hydroxyalkoxy groups such that ($S_{23}/S_{26}-0.2*MS$) is 0.38 or less, wherein MS is the molar substitution of hydroxyalkoxy groups and $S_{23}$ represents the molar fraction of the anhydroglucose units, wherein only the two hydroxyl groups at the 2- and 3-positions of the anhydroglucose units are each substituted by a methoxy group and wherein $S_{26}$ represents the molar fraction of the anhydroglucose units, wherein only the two hydroxyl groups at the 2- and 6-positions of the anhydroglucose units are each substituted by a methoxy group.

2. The building composition of claim 1, wherein the at least one hydraulically setting material is a cementitious material and/or the at least one cellulose ether is a hydroxyethyl methyl cellulose and/or a hydroxypropyl methyl cellulose.

3. The building composition of claim 1, wherein ($S_{23}/S_{26}-0.2*MS$) is 0.35 or less, and/or MS is in the range of 0.11 to 1.00, and/or wherein the at least one cellulose ether has a degree of substitution of methoxy groups (DS) in the range of 1.2 to 2.2, and/or a viscosity of more than 150 mPa·s, as measured for a 1.5 wt. % aqueous solution of the cellulose ether at 20° C. and a shear rate of 2.55 s$^{-1}$.

4. The building composition of claim 1, wherein a 1.5 wt. % aqueous solution of the cellulose ether has a storage modulus G' of at least 50 Pa at 80° C., and/or does not have a detectable precipitation temperature at atmospheric pressure or has a gelation temperature that is less than 3° C. above the precipitation temperature, wherein the precipitation temperature is determined as the temperature in a log G' versus normal (non-log) temperature plot corresponding to the intersection of a first tangent fitted to the steady decrease of G' with increasing temperature in a temperature interval from 20° C. below to 3° C. below the temperature corresponding to the inflection point of a drop of G' to a local minimum, which is less than half of the value of the first tangent extrapolated to the same temperature, if any, and a second tangent fitted to said drop of G' to the local minimum in a temperature interval of 1° C. being centered at said inflection point, and wherein the gelation temperature is the temperature at which G'/G''=1, G' being the storage modulus and G'' being the loss modulus of the 1.5 wt. % aqueous solution of the cellulose ether as measured with a dynamic rheometer in oscillation shear flow at a constant frequency of 2 Hz and a constant deformation amplitude of 0.5% from 10° C. to 85° C. with a heating rate of 1° C./min.

5. The building composition of claim 1, wherein the at least one cellulose ether is present in an amount of 0.05 to 15 wt. %, based on the total dry weight of the building composition.

6. The building composition of claim 1 being a dry mortar composition, a composition for water proofing membranes, a mineral coating for insulation systems like external thermal insulation composite systems (ETICS) or exterior insulation and finish systems (EIFS), a self leveling flooring mortar composition, a repair mortar, a tile grout mortar or a cement based tile adhesive.

7. A method of applying a building composition to at least one structural construction element, which method comprises:
   a) Providing a building composition comprising at least one hydraulically setting material and at least one cellulose ether, wherein at least a part of the hydroxyl groups of the cellulose backbone of the at least one cellulose ether are substituted by methoxy groups and hydroxyalkoxy groups such that ($S_{23}/S_{26}-0.2*MS$) is 0.38 or less, wherein MS is the molar substitution of hydroxyalkoxy groups and $S_{23}$ represents the molar fraction of the anhydroglucose units, wherein only the two hydroxyl groups at the 2- and 3-positions of the anhydroglucose units are each substituted by a methoxy group and wherein $S_{26}$ represents the molar fraction of the anhydroglucose units, wherein only the two hydroxyl groups at the 2- and 6-positions of the anhydroglucose units are each substituted by a methoxy group,
   b) contacting the structural construction element with the building composition, and
   c) allowing the building composition to set.

* * * * *